Figure 1:
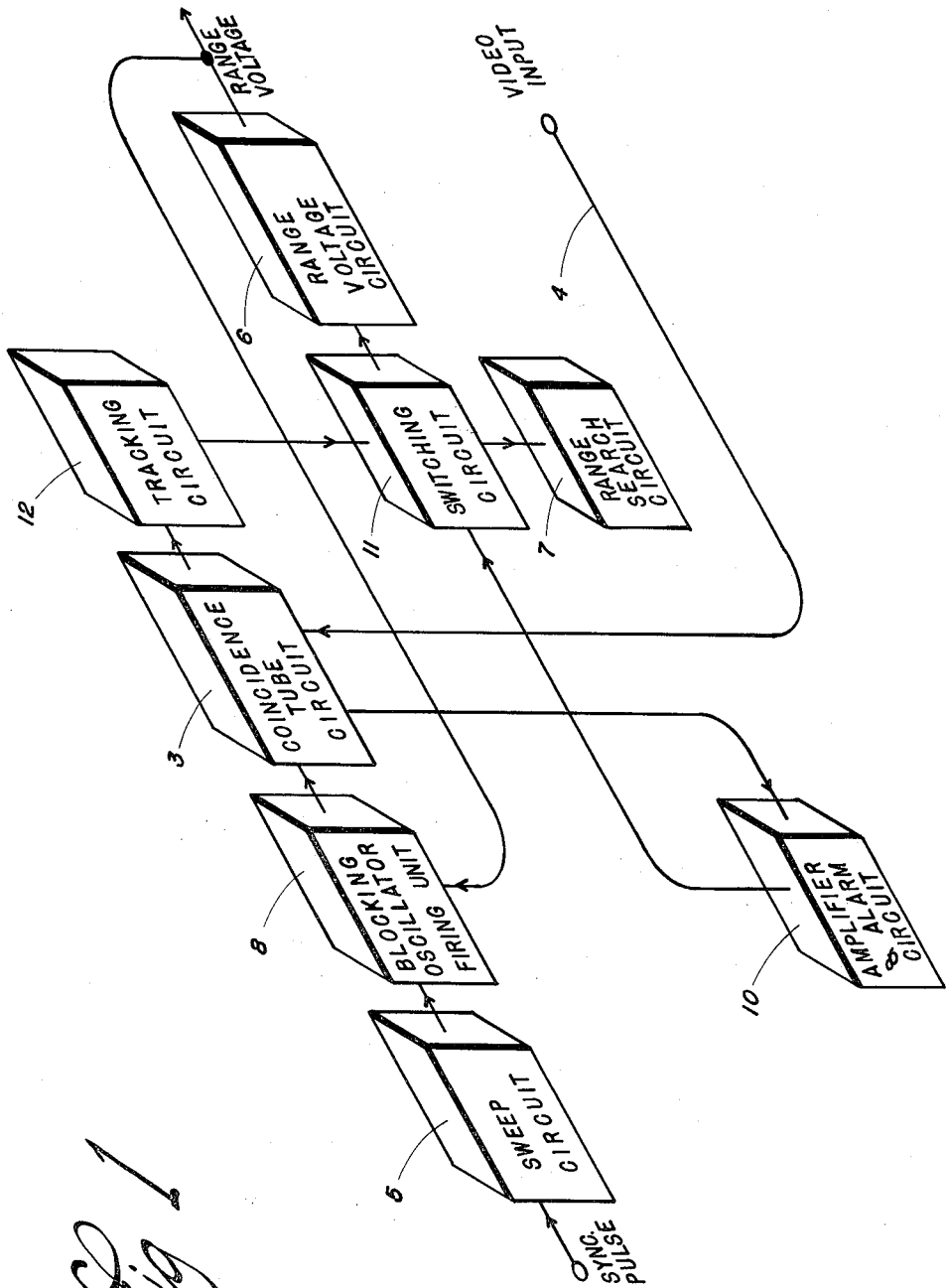

INVENTOR.
JOSEPH P. GLEASON

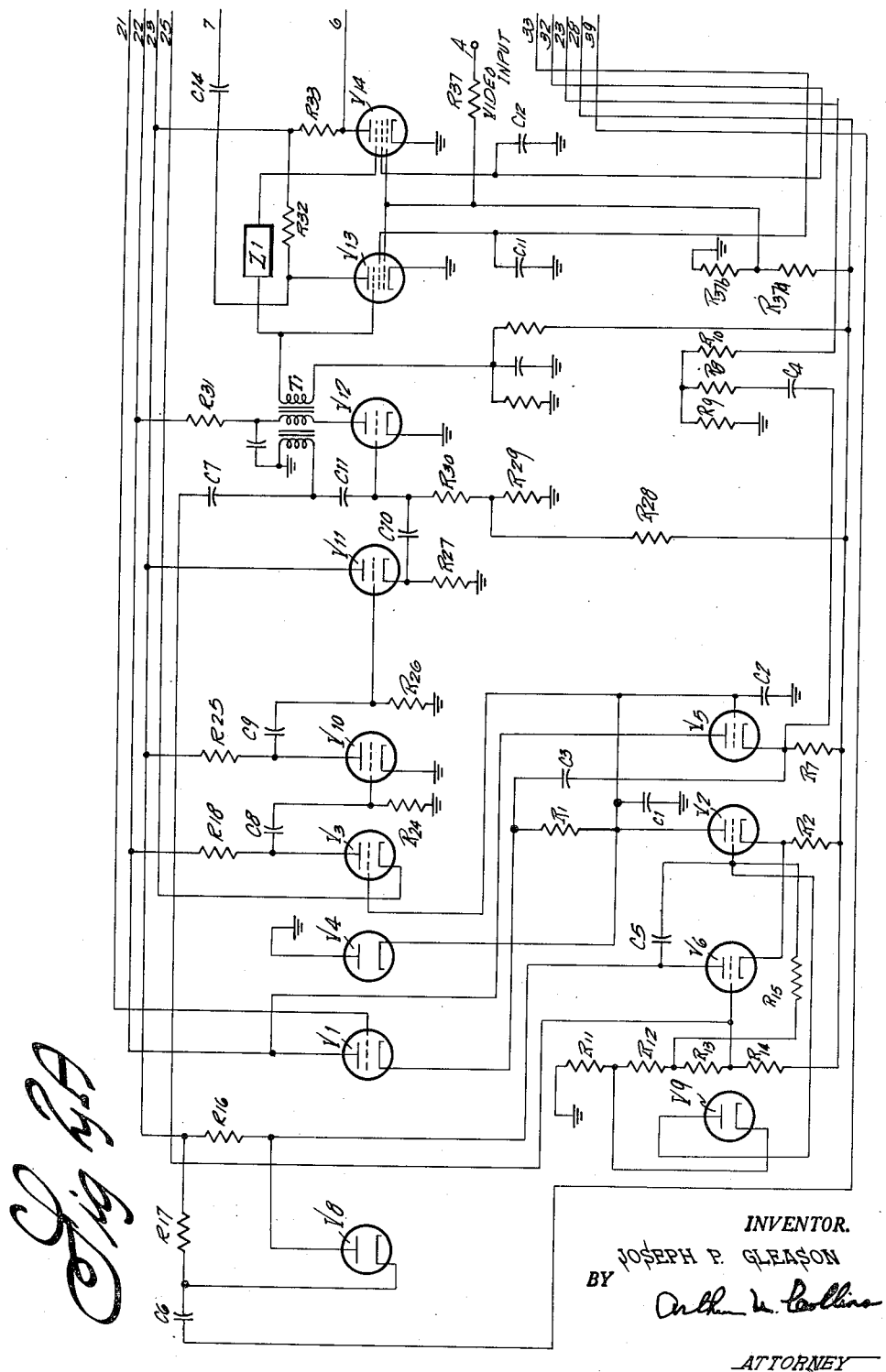

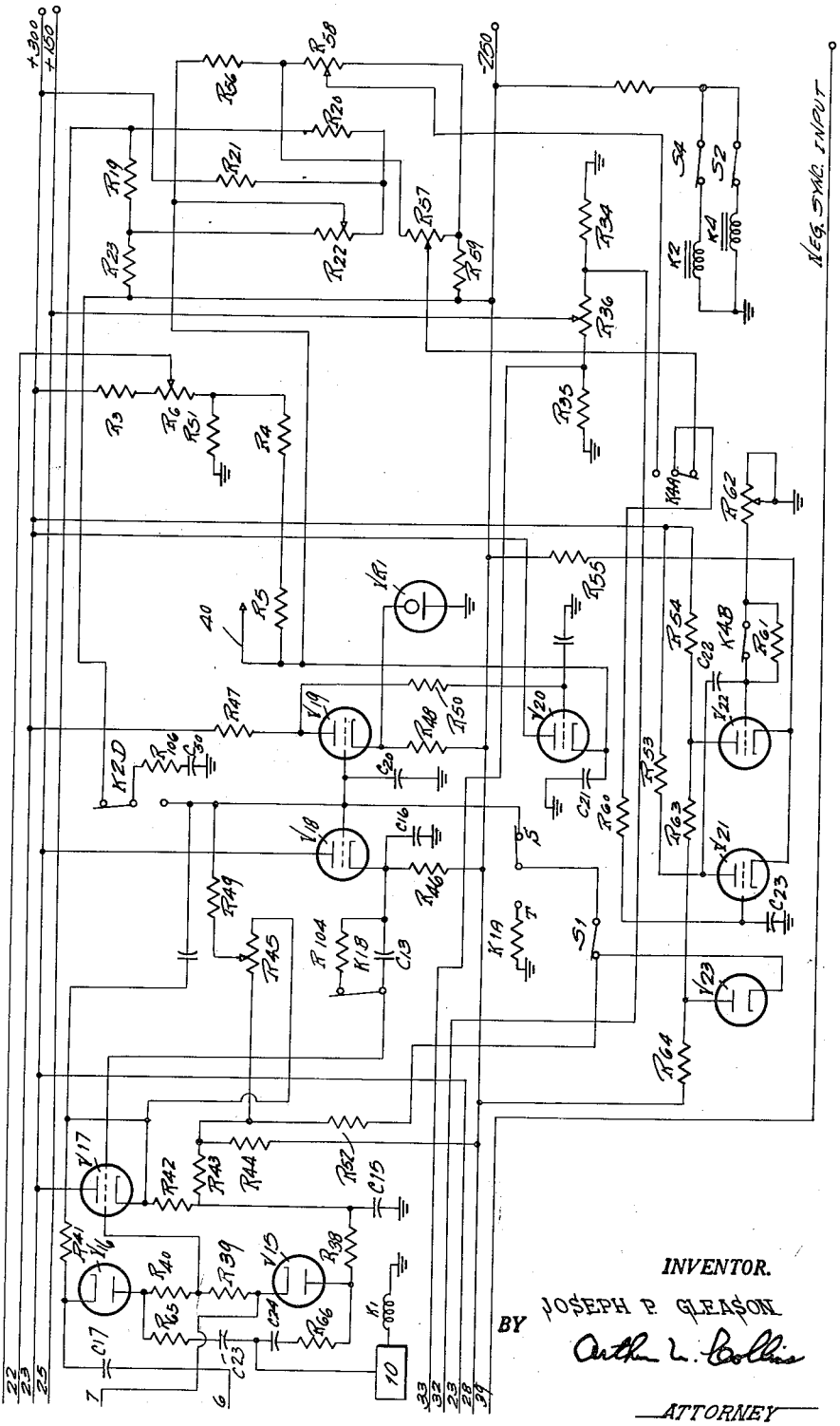

United States Patent Office 3,021,522
Patented Feb. 13, 1962

3,021,522
RADAR RANGE SEARCH SYSTEM
Joseph P. Gleason, Encino, Calif., assignor, by mesne assignments, to the United States of America as represented by the Secretary of the Navy
Filed Sept. 15, 1953, Ser. No. 380,379
3 Claims. (Cl. 343—7.3)

The present invention relates to electronic radar systems and the like and more particularly to a novel and improved unit for locating and determining the range of a distant object which may be moving at a varying rate.

In systems of this type a pulse of radio-frequency energy is ordinarily radiated outwardly by a highly directional type of antenna. If the transmitted waves strike an object or target capable of reradiating these waves, they are then returned in part to their source where they are used to continuously describe the azimuth, elevation and range characteristics of the target. Although these characteristics are perhaps of equal importance in providing a complete description of the exact location of the target, the present invention is primarily concerned only with apparatus for continuously providing the last mentioned range characteristic.

Accordingly, it is a principal object of the present invention to provide a novel and improved radar range unit which is completely automatic in operation and which continuously describes the position of the target with improved accuracy and reliability.

It is a further object of the present invention to provide a unique radar range unit which initially searches out and locates the position of a target in a given area and which thereafter energizes a tracking circuit that continuously indicates and/or records variations and changes in the movement and position of the target.

Other objects and many of the attendant advantages of this invention will be readily appreciated as the same becomes better understood by reference to the following detailed description when considered in connection with the accompanying drawings wherein:

FIGURE 1 is a diagrammatic view showing the general structural and functional arrangement of the major component parts of a preferred embodiment of the present invention.

FIGURES 2A and 2B when placed horizontally side by side provide a detailed circuit diagram of the preferred embodiment of the invention shown in FIGURE 1.

Before proceeding with a more detailed description of the improved range unit of the present invention, a brief functional explanation of the various component circuits thereof as well as the manner in which they are operatively associated with one another will be given in order to aid in an understanding of the detailed description that is to follow. As indicated heretofore the said range unit is capable of automatically performing two important operations. First, it searches out a particular target. Then it automatically tracks that target so as to continuously provide a voltage, the magnitude of which accurately describes the target range.

The coincidence circuit 3 which performs an important function during each of the said operations is designed to become energized (and therefore capable of receiving a target signal from the video input line 4) only during relatively small portions of time at selected intervals after each synchronizing pulse. More specifically the energization of the coincidence circuit 3 is possible only when the linearly increasing voltage output of the sweep circuit 5 becomes substantially equal to and/or greater than the magnitude of the voltage output of the range voltage circuit 6. Until this occurs at substantially the same instant that a target signal is received on the video input line 4, the unit continues its searching operation.

Throughout the searching operation the output voltage of the range voltage circuit 6 (and therefore the range voltage) is controlled and determined by the range search circuit 7 which repeatedly builds up linearly and quickly relaxes in a saw tooth fashion at a relatively low rate or frequency. This search voltage is then fed back to the firing unit 8 where the combined effect of the same and output voltage of the sweep circuit 5 causes the effective range, at which the firing unit (and therefore the gate circuit) become energized, to slowly increase and/or progress outwardly with successive synchronizing pulses until a preselected maximum range is reached. At that time energization of the firing and gating circuits abruptly returns to a preselected minimum range to repeat the outward searching process.

When in the course of the outward search a target is encountered, the resultant surge through the coincidence circuit 3 is conducted through a suitable amplifier alarm circuit 10. Energization of the alarm circuit immediately causes the switching circuit 11 to connect the tracking circuit 12 to the range voltage circuit 6. The tracking circuit then automatically regulates the magnitude of the range voltage in accordance with subsequent variations in the position of the target by energizing the firing unit 8 and the gate circuit 3 immediately prior to and subsequent to the receipt of the target signal in a manner which will be described more fully hereinafter.

Referring now to FIGURES 2A and 2B, of the drawing a more detailed description of the various component parts of the improved range unit of the present invention will be given.

*The sweep circuit*

The circuit which continuously generates the linear sweep voltage which is delivered to the firing unit 8 is shown in detail in the upper portion of FIGURE 2A of the drawing. As illustrated therein, the tubes V-1 and V-2 together with resistors R-1 and R-2 are connected in a series circuit which extends from the positive 300 volt supply line 22 to a negative 250 volt return 28. The grid of V-1 is connected to the resistor divider network which extends between the positive 300 volt line 22 and the range voltage line 40 and which includes resistors R-3, R-4, and R-5 and potentiometer R-6. In this way as will be more apparent hereinafter the voltage level at the upper extremity of resistor R-1 may be adjustably set to properly control the slope of the output sweep voltage of the circuit. The plate of V-2 where this desired sweep voltage is obtained is connected to the grid of V-3 which as will be described more fully hereinafter remains cut off until its potential becomes equal to or exceeds the potential of its cathode. The condensers C-1 and C-2 and the diode V-4 are connected as shown between the grid of V-3 and ground and as will be more apparent hereinafter contribute in determining and controlling the nature and the waveform of the sweep voltage applied thereto. Tube V-5 which together with resistor R-7 is also connected in series between the positive 300 volt supply line 22 and the negative 250 volt return 28 acts as a cathode follower, the output of which is connected to the cathode of V-1 through condenser C-3. The cathode of V-5 is also returned through condenser C-4, resistor R-8 and the resistor divider which includes resistors R-9 and R-10. The resistor divider network which is connected between ground and the negative 250 volt line 28 and which includes the resistors R-11, R-12, R-13, and R-14 provides a suitable bias through resistor R-15 for the grid of V-2 which normally (i.e. prior to the synchronizing pulse) passes a predetermined amount of current.

The tube V-6 together with the resistors R-16 and R-2 is connected in a series circuit that extends between the positive 150 volt line 23 and the negative return 28. Condenser C-5 which is connected between the plate of the V-6 and the grid of V-2 is adapted to permit variations in the plate circuit of V-6 to drive V-2. The diode V-9 is connected between the junction of resistors R-11 and R-12 and the grid of V-2 and the diode V-8 together with the resistor R-17 are positioned in parallel across resistor R-16.

In operation the above described sweep circuit is initiated each time a negative synchronizing pulse is delivered through the negative synchronizing line 39 and the condenser C-6 to the junction of the resistor R-17 and the diode V-8. When this occurs, the cathode of V-8 is driven negative, and V-8 begins to conduct thereby pulling the plate of the V-6 negative. This negative going pulse is passed through condenser C-5 to the grid of V-2 which is immediately cut off. When V-2 stops conducting, the potential of the cathode of V-6 drops (due to the decrease in current through R-2) until V-6 starts conducting. This current through V-6 keeps the plate of V-6 held down after the synchronizing pulse has occurred and thereby keeps V-2 cut off until the grid of V-2 rises exponentially to the conducting point or until the range gate terminates the cycle by applying a pulse which is conducted in a manner that will be more apparent hereinafter through condenser C-7 to the grid of V-6 and which cuts off V-6 thereby permitting V-2 to again conduct until the next synchronizing pulse.

When V-2 cuts off, current continues to flow through V-1 and R-1 so as to build up a charge on condensers C-1 and C-2 which causes a rise in voltage at the grid of V-3. This same rise is transferred to the cathode of V-1 by means of condenser C-3 and the cathode follower V-5, condenser C-3 being large enough so that the upper extremity of resistor R-1 is lifted at substantially the same rate as its lower extremity rises. In this way a very nearly constant value of charging current flows through resistor R-1 into the fixed condensers C-1 and C-2 thereby resulting in a linear rise of the grid of V-3.

As indicated heretofore the purpose of tube V-1 is to set the voltage level at the upper extremity of R-1 at the beginning of the sweep. This is accomplished by adjusting the position of the center tap of the range voltage slope potentiometer R-6 and therefore the voltage on the grid of V-1. Tube V-4 provides an effective clamp for the lower extremity of R-1 by preventing the voltage thereat from decreasing substantially below ground potential.

When the grid of V-2 rises either exponentially or by way of a gating pulse through condenser C-7 and again starts conducting, it immediately discharges condensers C-1 and C-2 so that the grid of V-3 quickly returns to substantially ground potential.

Tube V-9 is used to help the grid of V-2 to quickly return to the voltage it would acquire if it had sufficient time before the succeeding pulse to recover from the upward excursion of the plate of V-6 after the sweep. More specifically the positive surge through C-5 is quickly returned to ground through the diode V-9 and the resistor R-11.

The firing unit

The firing unit 8 includes the normally cut-off tube V-3, the amplifier V-10, the cathode follower V-11 and the blocking oscillator V-12. As described heretofore the grid of V-3 is driven in a positive direction in a linear saw tooth manner by the output of the sweep circuit 5. The plate of V-3 is connected to the positive 300 volt line 22 through resistor R-18 whereas its cathode is returned through resistors R-19 and R-20 to a resistor divider network which extends from the positive 300 volt line 22 through resistor R-21 potentiometer R-22 and resistor R-23 to the negative 250 volt line 28 and which is also driven through the variable arm of the potentiometer by the range voltage supply. The plate of V-3 is also directly coupled by means of condenser C-8 and resistor R-24 to the grid of amplifier V-10. The cathode of V-10 is grounded whereas its plate is connected through resistor R-25 to the positive 150 volt line 23 and is also coupled by means of condenser C-9 and resistor R-26 to the grid of the cathode follower V-11. The plate of V-11 is connected to the positive 150 volt line 23.

Its cathode is connected through resistor R-27 to ground and through the coupling condenser C-10 to the grid of the blocking oscillator V-12. The resistor divider circuit which includes resistors R-28 and R-29 provides a suitable negative bias through resistor R-30 for grid of V-12 such that it is normally cut off. The plate circuit of V-12 extends from the positive 300 volt line 22 through the resistor R-31, the primary of transformer T-1, and the tube to ground. A first secondary winding of the transformer T-1 drives the grid of the oscillator by way of condenser C-11 and at the same time directs a negative pulse through condenser C-7 back to the grid of V-6 which cuts off and terminates the voltage build-up of the sweep circuit as has been described more fully heretofore. A second secondary winding of transformer T-1 is connected directly to the suppressor grid of coincidence tube V-13 and through the delay line Z-1 to the suppressor grid of V-14 so as to drive the same in a manner which is described more fully hereinafter.

In operation when the grid potential of V-3 approaches and/or exceeds that of its cathode, the normally cut off V-3 passes a surge of current which directs a negative going pulse across condenser C-8 to the grid of V-10. Thereafter the pulse is amplified by V-10 and delivered through the cathode follower V-11 to the blocking oscillator V-12 which fires and with the help of the delay line Z-1 successively gates the coincidence tubes V-13 and V-14.

The gating and tracking circuits

Throughout the following portion of the present description it will be presumed that a target has been located between the two range gates and that the range unit is tracking the said target. Referring first to the overall structural arrangement of the said gating and tracking apparatus, the plate circuits of the coincidence tubes V-13 and V-14 extend from the positive 150 volt line 23 through the plate resistors R-32 and R-33 and the tubes to ground. The screen grids of V-13 and V-14 are bypassed to ground by the condensers C-11 and C-12 and are driven by the balancing network which includes the resistors R-34 and R-35, and the potentiometer R-36. The control grids of the coincidence tubes are energized by radar receivers which are not shown on the drawing through a circuit which includes the video input line 4 and the resistor R-37. The junction of the series connected resistors R-37a and R-37b between the negative 250 volt line 28 and ground is also coupled to the control grids of tubes V-13 and V-14 to provide a bias that normally maintains V-13 and V-14 cut off. The output circuit of coincidence tube V-13 which effects and controls the potential across condenser C-13 in a manner which will be described more fully hereinafter includes the condenser C-14 and a pair of branch circuits. One of the said branch circuits extends through diode V-15, resistor R-38 and condenser C-15 to ground whereas the other extends through resistor R-39, the grid of cathode follower V-17, condenser C-13, and condenser C-16 to ground. The output circuit of coincidence tube V-14 which also effects and controls the potential across condenser C-13 includes condenser C-17, diode V-16, resistor R-40, the grid of V-17, condenser C-13 and condenser C-16. Tube V-16 is normally biased to cut off by resistor R-41 which is positioned between the cathode thereof and the cathode of V-17. Tube V-15 is also normaly biased to cut off by being suitably connected to the cathode of V-17 and the negative 250 volt line 28 by means of resistors R-42, R-43, and resistor R-44. The plate of the cathode follower V-17 is tied directly to the positive 150 volt line 23 whereas its cathode circuit which includes cathode resistors R-42 and R-43 controls the voltage potential across the potentiometer R-45.

The voltage potential across condenser C-13 is also controlled by the output of the cathode follower V-18, the plate circuit of which extends from the positive 150 volt line 23 through V-18 and resistor R-46 to the negative 250 volt line 28. By pass condenser C-16 is connected between the cathode of V-18 and ground. The grid of V-18 is connected directly to the grid of V-19, the plate circuit of which extends from the positive 300 volt line 22, through resistor R-47, tube V-19, and resistor R-48 to the negative 250 volt line 28. The cathode of V-19 is preferably tied to ground as shown through the voltage regulator VR-1. The grids of V-18 and V-19 are driven during the tracking operation by a charging current which flows from the variable arm of the potentiometer R-45 through resistor R-49 into condenser C-20. The plate of the amplifier V-19 is connected through resistor R-50 to the grid of cathode follower V-20, the plate circuit of which extends from the positive 300 volt line 22 through V-20, resistors R-4 and R-5, to the range voltage slope divider network which includes the series of resistors R-51, R-6 and R-3 between the positive 300 volt line 22 and ground. By-pass condenser C-21 is connected between the cathode of V-20 and ground. The output of cathode follower V-20 provides the desired output voltage which continuously indicates the target range.

In operation once a selected target has been located by the range search circuit which will be described more fully hereinafter, the above described circuits automatically follow or track variations in the position of the same. More specifically when a target signal on the video input line 4 is delivered to the coincidence tubes V-13 and V-14 at a time when their suppressor grids are lifted by energization of the firing unit 8, V-13 and V-14 fire successively, the circuit constants being so arranged that V-13 fires first so as to produce a so-called early gate which occurs immediately prior to the target pulse whereas V-14 (due to the delay line Z-1) fires immediately after the target pulse to produce a so-called late gate.

When the target pulse is maintained substantially equidistant between the early and late gating operations, the plates of the coincidence tubes V-13 and V-14 each experience a similar drop in potential so that the charge on condenser C-13 remains substantially unchanged. Accordingly, when tube V-13 fires, the increase of current through resistor R-32 produces a sharp negative going pulse at the plate of V-13 which is directed through a circuit which includes condenser C-14, diode V-15, resistor R-38 and condenser C-15. The voltage change across condenser C-14 will also cause a current to flow through resistor R-39, the grid of V-17, condenser C-13 and condenser C-16 to ground whereby a more positive charge is built up upon the left side of condenser C-13. When, however, tube V-14 fires shortly thereafter, the increase in plate current through its plate resistor produces a similar sharp negative going pulse at the plate of V-14 which is directed through a circuit including condenser C-17, diode V-16, resistor R-40, the grid of V-17, condenser C-13 and condenser C-16. This pulse through condenser C-13 produces a negative neutralizing surge toward the left side of C-13 which is substantially equal to the previous positive build-up during the early gate. Consequently, when the early and late gates similarly straddle the target signal and the coincidence tubes V-13 and V-14 pass equal surges of current, the resultant change on condenser C-13 remains substantially unchanged.

When this condition prevails the cathode follower V-17 is independently driven in a manner which will be more apparent hereinafter by energy fed back from the grid of V-19 through the cathode follower V-18. The output of cathode follower V-17 directs energy through potentiometer R-45 and resistor R-49 to the grid of amplifier V-19 where it charges the condenser C-20 between the grid of V-19 and ground. This charge on capacitor C-20 is fed in part as already indicated back through V-18 and V-17 to the grid of V-19 where it is used to sustain the potential across C-20 and in part through amplifier V-19 and cathode follower V-20 to provide the desired range voltage. In this way, as long as the early and late gates properly straddle the target pulse, the above described feedback circuit through V-18 and V-17 to V-19 maintains the capacitor C-20 properly charged so that the output range voltage continues to accurately describe the position of the target.

When, however, the target moves during successive synchronizing pulses such that one coincidence tube carries a heavier pulse than the other, due to a resultant change in potential across condenser C-13 an effective error signal is transmitted therefrom through cathode follower V-17 to the grid of V-19 such that a proper correction of the rate of change of range voltage is immediately made.

*Range search circuit*

If and when no target has been encountered, the above described range gates are energized by the range search circuit 7 at an effective range which moves outwardly in a step by step manner with each successive cycle of the equipment, each cycle being initiated by a synchronizing pulse on line 39. When the gates reach some predetermined maximum range, they fly back at great speed to a predetermined minimum range in order to repeat the outward searching process. The structural and operative features of this portion of the range unit will be now described in detail.

In the absence of a target signal, the condenser C-20 and therefore the grid of V-19 will be linearly swept in a negative direction by a charging current which flows in a circuit from the negative 250 volt line 28 through resistors R-44 and R-52, contacts S-1 and K-1A to the grid of V-19. In order to quickly pull the grid of V-19 back up to the desired level so that the negative sweep can be repeated, the circuits of tubes V-21, V-22 and V-23 are provided. Tubes V-21 and V-22 are arranged in a conventional one shot multivibrator circuit. Accordingly, their plates are connected through resistors R-53 and R-54 to the positive 300 volt line 22 and their cathodes are tied together and returned to the negative 250 volt line 28 through resistor R-55. The plate of V-21 is also coupled to the grid of V-22 through condenser C-22. The grid of V-21 is normally biased to cut off by a resistor divider network which is connected between the range voltage line and the negative 250 volt line 28 and which includes in series resistor R-56, the parallel arrangement of potentiometers R-57 and R-58, and resistor R-59. Depending upon the position of relay contact K-4A the grid of V-21 may be connected through resistor R-60 to one or the other of the variable arms of potentiometers R-57 and R-58 such that, as will be more apparent hereinafter, the searching operation may be initiated from either of a pair of preselected minimum values of range. The grid of V-21 is also coupled to ground by means of bypass condenser C-23. The grid of V-22 is connected to ground by a circuit which includes the parallel arrangement of contact K-4B and resistor R-61 and rheostat R-62. The cathode of diode V-23 is connected through contacts S-1 and K-1A to the grid of V-19. Its plate is connected to a resistor divider network which extends from the positive 300 volt line 22 through resistors R-54, R-63 and R-64 to the negative 250 volt line 28.

In operation tube V-22 of the above described flyback circuit continues to conduct until the range voltage reaches a predetermined maximum value. When this occurs the upper extremities of the potentiometers R-57 and R-58 will be sufficiently lifted by way of a connection through resistor R-56 to the range voltage line to permit V-21 to begin conducting. Tubes V-21 and V-22 then operate in a manner similar to a one shot multivibrator so that V-22 will be cut off for a predetermined short time. When this happens, the plate potential of V-23 will be raised until V-23 draws current from the grid of V-19 thereby lifting it in a positive direction and returning the range search voltage to a predetermined minimum value.

If it is desired to cause the gates to search one specific range area (such as for example 10 to 20 nautical miles) then contact K-4A will be positioned such that the grid of V-21 will be connected to potentiometer R-57, which is adjusted such that the multivibrator fires at the 20 mile point. The time constant of condenser C-22 is then adjusted by means of the variable resistor R-62 so that V-21 remains cut off only long enough to bring the range gates back to the 10 mile point. If instead it is desired to search a different predetermined range area (such as for example 0 and 10 nautical miles) then relay contact K-4A will be positioned such that the grid of V-21 is connected to potentiometer R-58, which is adjusted to fire the multivibrator at the 10 mile point. Relay K-4 by means of contact K-4B which shorts out resistor R-61 also suitably varies the time constant characteristic of condenser C-22 so that the range voltage will be properly returned to the zero point.

*The alarm circuit*

When, during the outward searching operation of the range gates, a target is encountered, relay K-1 is energized through the amplifier alarm circuit 10 so that movement of its contacts from their right hand positions shown in the drawing to their left hand positions will automatically terminate the searching process and begin tracking the particular target.

Obviously many modifications and variations of the present invention are possible in the light of the above teachings. It is therefore to be understood that within the scope of the appended claims the invention may be practiced otherwise than as specifically described.

What is claimed is:

1. In a radar range unit having a transmitter that generates periodic outgoing pulses and a receiver that detects incoming echo pulses a range search circuit comprising a sweep circuit having a relatively high sweep frequency, said sweep circuit being synchronized with the periodic outgoing pulses of the transmitter; a capacitor element; a charging circuit for the capacitor element; a voltage source; a resistor divider network connected across said voltage source; a diode having a cathode which is coupled to the capacitor element and an anode which is coupled to the resistor divider network; a multivibrator circuit which includes a normally conducting and a normally cutoff electron tube, the plate circuit of the normally conducting tube also being coupled to the resistor divider network; means responsive to the presence of a predetermined maximum potential across the capacitor element for firing the normally cutoff tube of the multivibrator, cutting off the normally conducting tube of the multivibrator and raising the potential of the anode of the diode such that the capacitor element is periodically discharged a predetermined amount at a relatively low frequency rate; and means responsive when the output potential of the relatively high frequency sweep circuit is substantially equal to the relatively low frequency changing potential across the capacitor element for conditioning the receiver for receipt of an incoming echo pulse.

2. The apparatus described in claim 1 which further includes means for varying the parameters of the multivibrator to adjust the minimum potential of the capacitor element and thereby control the effective minimum searching range of the circuit.

3. The apparatus described in claim 1 which further includes means coupled to the capacitor element for varying the predetermined maximum potential across the capacitor element at which the normally cutoff tube of the multivibrator is fired.

References Cited in the file of this patent

UNITED STATES PATENTS

| | | |
|---|---|---|
| 2,491,029 | Brunn | Dec. 13, 1949 |
| 2,516,356 | Tull et al. | July 25, 1950 |
| 2,536,488 | Boothroyd et al. | Jan. 2, 1951 |
| 2,538,028 | Mozley | Jan. 16, 1951 |
| 2,594,916 | Gulnac | Apr. 29, 1952 |
| 2,628,349 | Nightenhelser | Feb. 10, 1953 |
| 2,639,419 | Williams et al. | May 19, 1953 |
| 2,677,758 | Robinson et al. | May 4, 1954 |
| 2,886,810 | Gleason | May 12, 1959 |